United States Patent [19]

Lüpertz

[11] 4,211,310
[45] Jul. 8, 1980

[54] SPOT-TYPE DISC BRAKE

[75] Inventor: Hans-Henning Lüpertz, Darmstadt, Fed. Rep. of Germany

[73] Assignee: ITT Industries, Incorporated, New York, N.Y.

[21] Appl. No.: 964,862

[22] Filed: Nov. 30, 1978

[30] Foreign Application Priority Data

Dec. 22, 1977 [DE] Fed. Rep. of Germany ....... 2757392

[51] Int. Cl.² .................................................. F16D 65/224
[52] U.S. Cl. .................................... 188/73.3; 188/71.9
[58] Field of Search ..................... 188/71.8, 73.3, 73.5, 188/196 P

[56] References Cited

U.S. PATENT DOCUMENTS

| 2,938,609 | 5/1960 | Burnett | 188/71.8 X |
| 3,365,028 | 1/1968 | Hajek | 188/73.3 |
| 3,384,202 | 5/1968 | Swift | 188/73.3 |

FOREIGN PATENT DOCUMENTS 959183  5/1964  United Kingdom ..................... 188/73.3

Primary Examiner—Duane A. Reger
Attorney, Agent, or Firm—John T. O'Halloran; Alfred C. Hill

[57] ABSTRACT

There is disclosed a caliper guide for a floating-caliper disc brake comprising parallel grooves in adjacent guide surfaces of the caliper and caliper support and roller elements supported in the grooves to movably connect the caliper and caliper support. By means of this caliper guide, low sliding forces are achieved without the occurrence of a clearance which could lead to disturbing rattling noises.

10 Claims, 10 Drawing Figures

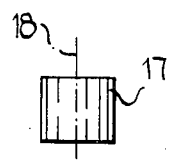
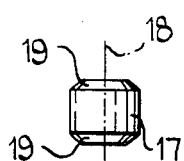
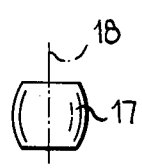
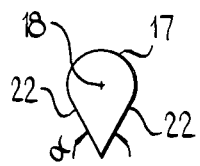
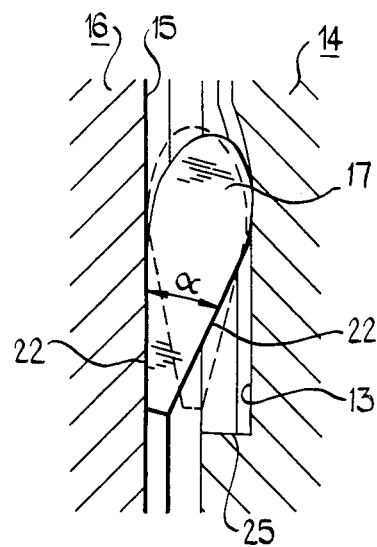

SPOT-TYPE DISC BRAKE

BACKGROUND OF THE INVENTION

This invention relates to a spot-type disc brake having a caliper straddling the brake disc, connected to an actuating device directly controlling one brake shoe on one side of the brake disc, controlling the other brake shoe on the other side of the brake disc and being axially and slidably guided at the two peripheral front faces in a caliper carrier rigidly mounted on the brake carrier.

In such floating-caliper or floating-frame spot-type disc brakes, the brake shoe located on the side of the actuating device is generally directly supported on the brake carrier in peripheral direction, while the torques received by the opposite brake shoe are transmitted through the floatingly mounted caliper and the guiding surfaces to the caliper carrier and thereby to the brake carrier. For this reason, the guiding surfaces between caliper and caliper carrier are not only required to offer caliper sliding with minimum resistance, but they must also have sufficient strength for the transmission of the braking torques. The brake carrier may straddle the brake disc, but this is not a necessity.

SUMMARY OF THE INVENTION

It is an object of the present invention to provide a spot-type disc brake of the type initially referred to guaranteeing the absence of tangential and radial play with small sliding forces, and without the necessity of using separate spring elements.

A feature of the present invention is the provision of a spot-type disc brake comprising: a caliper straddling a brake disc, the caliper being actuated by an actuating device to directly control one brake shoe disposed on one side of the disc and another brake shoe disposed on the other side of the disc; a caliper carrier rigidly mounted to a brake carrier, the caliper carrier having a pair of oppositely disposed guiding surfaces each adjacent one of a pair of oppositely disposed front surfaces of the caliper; and a pair of roller elements disposed between each of the pair of guiding surfaces and the pair of front surfaces for axially, slidably guiding the caliper relative to the caliper carrier, each of the roller elements having a vertical axis parallel to the disc and perpendicular to an imaginary line interconnecting the pair of front surfaces.

Because of the rolling friction, the forces needed for the caliper displacement are low. Tangential and radial absence of play are guaranteed and separate spring elements are not needed, since the caliper carrier can be elastically expanded by the introduced roller elements. The elastic clamping effect the caliper carrier thereby exerts on the caliper does not impair the ease of caliper movement, because there exists exclusively rolling friction between caliper and caliper carrier. It is essential for the invention that the two arms of the caliper carrier are of elastically resilient design to a degree ensuring the elastic clamping of the rolling elements between caliper and caliper carrier while maintaining the capacity to receive the braking torque. In this manner separate spring elements between the two relatively movable parts are avoided without the risk of loosening and consequent rattling noises.

The rolling motion utilized by the invention is not prone to contamination by dust, since any particles of dirt will be crushed without difficulty during the displacement motion of the caliper which occurs preferably under hydraulic control. For this reason the guiding system need not even be sealed against the outside. An advantageous production by broaching is possible.

The roller elements may be cylinders with the entire cylinder surface and part of the end surfaces abutting against cooperating surfaces of the caliper carrier.

Barrel-shaped roller elements abutting against a correspondingly curved guiding surface of the caliper carrier are also advantageous.

Particularly advantageous are roller elements in the form of a cylinder with chamfers at both edges which abut against cooperating inclined areas of the caliper carrier guiding surfaces. The sliding friction of the conical area is substantially lower than the friction of the front surface of a purely cylindrical roller element.

The invention can be used to obtain a defined, preset design clearance between a brake pad and the brake disc by providing for limitation of the range of rotation of the roller elements according to the desired design clearance such that, if the design clearance is exceeded as a result of brake shoe wear, sliding friction occurs and the return of the brake shoe occurs only within the design clearance. For this purpose, the periphery of the roller elements may be provided with projections limiting the range of rotation.

It is particularly advantageous, however, to have roller elements which, in cross section, converge on one side into two plane surfaces intersecting at an angle which corresponds to the range of rotation determining the design clearance. The plane surfaces abut against the front surface or guiding surface in either limit position for rotation, thereby causing the forced change from rolling friction to sliding friction. The sliding friction avoids a return of the brake shoes beyond the design clearance, while the sliding friction can be overcome without difficulty to re-adjust the caliper when a certain brake pad wear is attained.

A particularly advantageous improvement of the invention is characterized by the roller elements having the shape of an ellipse in the curved area, whose longer axis extends parallel to the direction of displacement of the caliper. During braking this design causes an increase in the elastic expansion of the two caliper carrier arms, thereby generating a return torque which guarantees return of the caliper after braking without additional return springs or the like. The elliptical shape shall not depart too much from a circular shape to avoid excessive spreading of the caliper carrier arms. It is particularly important that the plane surfaces intersecting at an angle are used together with the ellipse shape, since they limit the spreading effect.

The elliptical shape of the roller elements and the plane intersecting surfaces provide an ideal combination, since there is only rolling friction between caliper and caliper carrier in the normal operating range of the brake. The return occurs without the necessity of additional spring elements. Further, the correct brake clearance is automatically guaranteed.

BRIEF DESCRIPTION OF THE DRAWING

Above-mentioned and other features and objects of this invention will become more apparent by reference to the following description taken in conjunction with the accompanying drawing, in which:

FIG. 3 is a radial view of a first embodiment of a roller element as adapted for use in the brake of FIGS. 1 and 2;

FIG. 4 is a radial view of another embodiment of a roller element;

FIG. 5 is another radial view of a roller element suitable for the purposes of the present invention;

FIG. 6 is an axial section of a roller element warranting a predetermined design clearance for the spot-type disc brake according to the present invention; and FIG. 7 is an enlarged section according to FIG. 2 showing another advantageous embodiment of the roller element.

DESCRIPTION OF THE PREFERRED EMBODIMENTS

Figure 1:
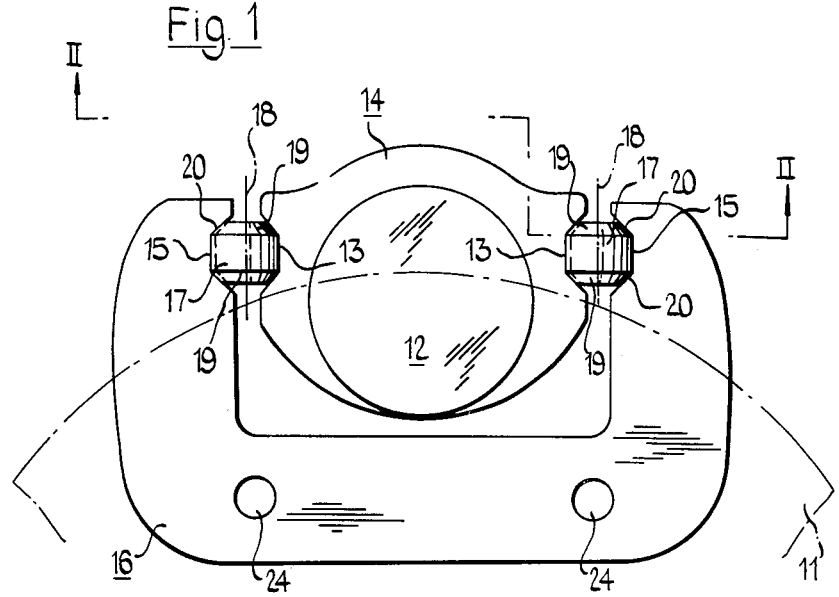
FIG. 1 is an axial view of a spot-type disc brake in accordance with the principles of the present invention.
Figure 2:
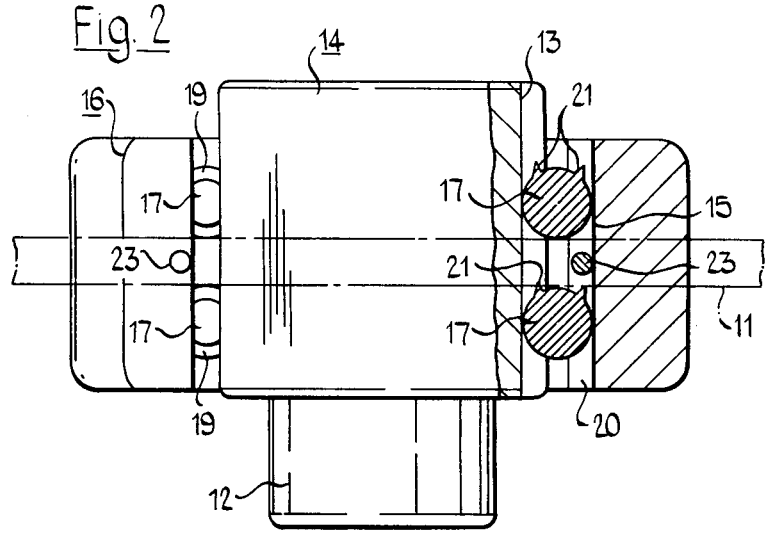
FIG. 2 is a section along the line II—II of FIG. 1.

According to FIGS. 1 and 2, a caliper carrier 16 fixed by holes 24 to the axle flange (not shown) on one side of the brake disc 11 straddles the outer periphery of the brake disc. The two arms of caliper carrier 16 have internal guiding surfaces 15 located at a distance from front surfaces 13 of an axially displaceable caliper 14 arranged between the caliper carrier arms. Between each front surface 13 and guiding surface 15, the invention provides two roller elements 17 located in the way shown in FIGS. 1 and 2. The dimensioning is so that roller elements 17 slightly spread the two arms of caliper carrier 16 elastically, so they are pushed against front surfaces 13 with a force of 200–400 kp (kilopounds) or 2000–4000 N (newtons) approximately.

The caliper 14 carries on one side of brake disc 11 the preferably hydraulic actuation device 12 which directly acts on one brake shoe (not shown) on the one side of brake disc 11. On the other side of brake disc 11, the caliper 14 actuates the other brake shoe (not shown either).

The axes 18 of roller elements 17 extend parallel to the plane of brake disc 11 and vertically to the line connecting front surfaces 13.

The roller element 17 of the embodiment of FIGS. 1 and 2, shown in FIG. 4 in detail, has chamfers 19 at both edges which cooperate with correspondingly inclined areas 20 of guiding surfaces 15 so as to support caliper 14 not only in the peripheral direction but also in the radial direction.

The movement of roller elements 17 in their race may be limited by a cage not shown here, which keeps roller elements 17 at a distance. It is also possible, as shown in FIG. 2, to provide stop pins 23 on the guiding surfaces to maintain the distance of roller elements 17 and to avoid their leaving the associated races.

According to FIG. 2 roller elements 17 may be provided with radial projections 21 which limit the range of free rotation of the roller elements between surfaces 13 and 15 such that caliper 14 can only move with rolling friction in the range of the design clearance of the brake shoe under the direct control 1 of caliper 14. In this way, the brake shoe concerned is spaced apart from brake disc 11 by the design clearance only. If the design clearance is exceeded because of brake pad wear, caliper 14 is again able to approach brake disc 11 under sliding friction by an amount sufficient to re-establish the design clearance. In this way the arrangement of projections 21 is a simple means for preserving a predetermined design clearance.

The mode of operation of the embodiment described with reference to FIGS. 1, 2 and 4 is as follows:

The caliper carrier 16 must be slightly elastically expanded for the insertion of roller elements 17 between surfaces 13 and 15. The roller elements 17 are therefore resiliently pressed against front surfaces 13 of caliper 14.

When a braking pressure is exerted at actuating device 12, caliper 14 is displaced axially relative to caliper carrier 16 until the brake shoe directly acted upon by caliper 14 is in abutment with brake disc 11. This movement takes place with minimum resistance, since roller elements 17 freely roll on surfaces 13 and 15. In the limit positions of the range of rotation of roller elements 17, projections 21 come into abutment with front surface 13 of guiding surface 15.

The cylindrical area of roller element 17 is relatively large, since it is required to transmit braking torques. The relatively small chamfers 19 at the edges of roller element 17 are sufficient, however, for radially supporting caliper 14.

As shown in FIG. 3, roller element 17 may be a cylinder with exactly circular section in the most simple case. In this embodiment, however, the frontal sliding friction is slightly higher than if a roller element according to FIG. 4 is used. Another advantage of chamfer 19 as shown in FIG. 4 consists in the absence of clearance of guidance in the radial direction. This advantage is also achieved when using a barrel-shaped roller element 17 as shown in FIG. 5.

Instead of projections 21, as shown in FIG. 2, roller elements 17 may also have an axial section shaped as shown in FIG. 6. The normally rotationally symmetric shape converges on one side into two plane surfaces 22 intersecting at an angle α. The roller element so designed can only roll between a position in which the one surface 22 abuts against front surface 13 and a position in which the other surface 22 abuts against guiding surface 15. The angle α may be selected so it corresponds to a predetermined design clearance of the brake shoe directly controlled by caliper 14.

The curved shape of roller element 17 as shown in FIG. 7 is not strictly symmetrical with respect to rotation any more, but elliptical in section (elliptical cylinder). On the one side, however, the ellipse again converges into two plane surfaces 22 which intersect at an angle α.

The dashed lines of FIG. 7 show the specially shaped roller element 17 in a middle position. This position corresponds to the minimum amount of spreading of the arms of caliper carrier 16. The roller element 17 shown in full lines is shown in the position it has when the brake pad controlled by caliper 14 is in abutment with brake disc 11. In this case the left plane surface 22 moves into abutment with guiding surface 15, so that a further movement of caliper 14 can only be obtained by overcoming the sliding friction. The angular freedom of movement of roller element 17 between the position shown in dashed lines and the position shown in full lines corresponds to the clearance of the brake shoe controlled by caliper 14.

By virtue of the elliptical design of roller element 17, the arms of caliper carrier 16 are slightly spread as the roller element is moving from the dashed-line to the full-line position, so that a return torque is generated which tends to return roller element 17 to its position shown in dashed lines. The caliper 14 is thereby displaced in an axial direction until the design clearance is re-established.

While the ellipse shape is preferred for the design of the one half of roller element 17, other curved shapes having a suitable spreading effect may also be used.

A stop 25 limits the axial movability of roller element 17 relative to caliper 14, which is important when sliding the casing back for brake pad replacement. Of course the piston of actuating device 12 must be located in caliper 14 so that it is able to exert its compression force in the range of brake disc 11. The brake shoes too are placed so as to be located in the area of brake disc 11.

While I have described above the principles of my invention in connection with specific apparatus it is to be clearly understood that this description is made only by way of example and not as a limitation to the scope of my invention as set forth in the objects thereof and in the accompanying claims.

I claim:

1. A spot-type disc brake comprising:
   a caliper straddling a brake disc, said caliper being actuated by an actuating device to directly control one brake shoe disposed on one side of said disc and another brake shoe disposed on the other side of said disc;
   a caliper carrier rigidly mounted to a brake carrier, said caliper carrier having a pair of oppositely disposed guiding surfaces each adjacent one of a pair of oppositely disposed front surfaces of said caliper; and
   a pair of rollers disposed between each of said pair of guiding surfaces and said pair of front surfaces for axially, slidably guiding said caliper relative to said caliper carrier, each of said rollers having a longitudinal axis parallel to said disc and perpendicular to an imaginary line interconnecting said pair of front surfaces.

2. A brake according to claim 1, wherein
   each of said rollers are cylinders with the entire cylinder surface and part of the end surfaces thereof abutting against a cooperating surface portion of said pair of guiding surfaces.

3. A brake according to claim 1, wherein
   each of said rollers are barrel-shaped and abut against a correspondingly shaped portion of said pair of guiding surfaces.

4. A brake according to claim 1, wherein
   each of said rollers are cylinders with chamfers at both ends abutting against cooperating inclined areas of said pair of guiding surfaces.

5. A brake according to claim 1, wherein each of said rollers include
   means to limit the range of rotation of its associated one of said rollers in accordance with a designed clearance between a brake pad and said disc such as to cause sliding friction if said design clearance is exceeded as a result of brake pad wear and to cause return of brake shoes only within said design clearance.

6. A brake according to claim 5, wherein said means includes
   projections disposed on the periphery of each of said rollers.

7. A brake according to claim 5, wherein said means includes
   the shape of each of said rollers which, in cross section, includes on one side of said longitudinal axis two plane surfaces intersecting at a given angle and on the other side of said longitudinal axis a curved portion.

8. A brake according to claim 7, wherein said curved portion is in the shape of an ellipse whose longer axis extends parallel to the direction of displacement of said caliper.

9. A brake according to claim 1, wherein one of each of said pair of rollers is disposed on one side of said disc and the other of each of said pair of roller elements is disposed on the other side of said disc.

10. A brake according to claim 1, further including a stop on each of said pair of guiding surfaces disposed between each of said rollers of each of said pair of rollers.

* * * * *